US011492958B2

(12) United States Patent
Herceg et al.

(10) Patent No.: US 11,492,958 B2
(45) Date of Patent: Nov. 8, 2022

(54) BOOST PRESSURE CONTROL FOR ELECTRICALLY ASSISTED TURBOCHARGERS

(71) Applicant: Garrett Transportation I Inc., Torrance, CA (US)

(72) Inventors: Martin Herceg, Bratislava (SK); Lubomir Baramov, Prague (CZ); Jaroslav Pekar, Pacov (CZ)

(73) Assignee: Garrett Transportation I Inc., Torrance, CA (US)

( * ) Notice: Subject to any disclaimer, the term of this patent is extended or adjusted under 35 U.S.C. 154(b) by 10 days.

(21) Appl. No.: 17/122,240

(22) Filed: Dec. 15, 2020

(65) Prior Publication Data

US 2022/0186660 A1 Jun. 16, 2022

(51) Int. Cl.
F02B 37/14 (2006.01)
F02B 37/04 (2006.01)
(Continued)

(52) U.S. Cl.
CPC ............ F02B 37/14 (2013.01); F02B 37/04 (2013.01); F02B 37/18 (2013.01); F02D 23/00 (2013.01)

(58) Field of Classification Search
CPC .......... F02B 37/14; F02B 37/04; F02B 37/18; F02B 37/10; F02B 37/12; F02B 37/24; F02B 39/10; F02D 23/00; F02D 41/1401; F02D 2041/1417; F02D 2041/1429; F02D 41/0007
See application file for complete search history.

(56) References Cited

U.S. PATENT DOCUMENTS

| 5,083,434 A | 1/1992 | Dahlgren et al. |
| 5,906,098 A | 5/1999 | Woolenweber et al. |

(Continued)

FOREIGN PATENT DOCUMENTS

| CN | 10732742 A | 11/2017 |
| EP | 2050943 A1 | 4/2009 |
| JP | 2016205301 A | 12/2016 |

OTHER PUBLICATIONS

Extended European Search Report for EP21207000.7 dated May 17, 2022; 7 pages.

(Continued)

Primary Examiner — Audrey B. Walter
Assistant Examiner — Edward Bushard
(74) Attorney, Agent, or Firm — Seager, Tufte & Wickhem, LLP

(57) ABSTRACT

An example engine system is disclosed. The engine system may control a turbocharger of an internal combustion engine, and more particularly control a boost pressure provided by a turbocharger to an internal combustion engine. An example method for controlling a boost pressure provided by a turbocharger may include receiving a boost pressure demand and identifying a compressor speed demand to achieve the received boost pressure demand. The method may also include converting the compressor speed demand into a kinetic energy demand of the turbocharger rotating components and controlling the kinetic energy of the turbocharger rotating components to meet the kinetic energy demand by controlling power supplied by the turbine and the electric motor assist.

18 Claims, 8 Drawing Sheets

(51) Int. Cl.
*F02B 37/18* (2006.01)
*F02D 23/00* (2006.01)

(56) References Cited

U.S. PATENT DOCUMENTS

| | | |
|---|---|---|
| 6,637,205 B1 | 10/2003 | Ahmad et al. |
| 6,705,084 B2 | 3/2004 | Allen et al. |
| 7,047,740 B2 | 5/2006 | Fukasawa et al. |
| 7,127,892 B2 | 10/2006 | Akins et al. |
| 7,805,939 B2 | 10/2010 | Kimoto et al. |
| 7,905,091 B2 | 3/2011 | Kassner |
| 9,885,297 B2 | 2/2018 | Wang et al. |
| 10,422,289 B2 | 9/2019 | Xiao et al. |
| 2009/0000298 A1 | 1/2009 | Barthelet |
| 2017/0130644 A1* | 5/2017 | Keim .................... F02B 37/10 |
| 2019/0226390 A1 | 7/2019 | McConville et al. |
| 2019/0226391 A1 | 7/2019 | Buckland et al. |

OTHER PUBLICATIONS

Eriksson, "Modeling and Control of Turbocharged SI and DI Engines," Oil and Gas Technology, vol. 62, No. 4, pp. 523-538, 2007.

* cited by examiner

BOOST PRESSURE CONTROL FOR ELECTRICALLY ASSISTED TURBOCHARGERS

TECHNICAL FIELD

This disclosure relates generally to methods, devices, and/or systems for controlling a turbocharger of an internal combustion engine, and more particularly for controlling a boost pressure provided by a turbocharger to an internal combustion engine.

BACKGROUND

Turbochargers are often used to increase a boost intake air charge pressure (e.g., defined as force per unit area or energy per unit volume) to the intake manifold of an internal combustion engine. Turbochargers typically include a compressor and a turbine attached to a shaft. The turbine is designed to utilize the expansion/flow of exhaust gases from the internal combustion engine to drive the shaft, and thus the compressor. The compressor then compress air from an ambient inlet air pressure to a compressed boost pressure, which is then fed to the intake manifold of the internal combustion engine, often through an intercooler. An increased amount of fuel is mixed with the increased boost pressure to achieve an air/fuel ratio that is suitable for optimum combustion in the internal combustion engine. This results in more power that can be delivered by the internal combustion engine.

In some cases, such as at low RPMs of the internal combustion engine, the expansion/flow of exhaust gases is relatively low. When subsequent rapid increased power is desired from the internal combustion engine, it may take some time for the exhaust gases to spin up the turbocharger to deliver the desired boost pressure. This delay in responsiveness of the turbocharger is often referred to as turbo lag. In some cases, an electric motor assist may be coupled to the shaft of the turbocharger to assist in the acceleration and/or deceleration of the turbocharger shaft under certain operating conditions.

Controlling such turbochargers under dynamic operating conditions can be a challenge. The control algorithms are often non-linear and resource intensive. What would be desirable are improved methods, devices, and/or systems for controlling a turbocharger of an internal combustion engine.

SUMMARY

This disclosure relates generally to methods, devices, and/or systems for controlling a turbocharger of an internal combustion engine, and more particularly for controlling a boost pressure provided by a turbocharger to an internal combustion engine. An example method for controlling a boost pressure provided by a turbocharger, wherein the turbocharger includes turbocharger rotating components including a turbocharger shaft, a compressor for providing the boost pressure, and a turbine for driving the compressor through the turbocharger shaft, the turbocharger further including an electric motor assist for assisting in driving the compressor through the turbocharger shaft, and one or more actuators for controlling the boost pressure provided by the turbocharger, wherein during operation, the turbine and the electric motor assist are each capable of supplying power to the turbocharger shaft, and the compressor absorbs power to provide the boost pressure may include receiving a boost pressure demand and identifying a compressor speed demand to achieve the received boost pressure demand. The method may also include converting the compressor speed demand into a kinetic energy demand of the turbocharger rotating components and controlling the kinetic energy of the turbocharger rotating components to meet the kinetic energy demand by controlling power supplied by the turbine and the electric motor assist.

In addition or alternatively, wherein controlling the power supplied by the turbine and the electric motor assist includes using multivariable control with power constraints.

In addition or alternatively, wherein controlling the power supplied by the turbine and the electric motor assist includes controlling the power supplied by the turbine and the power supplied by the electric motor assist to collectively meet the kinetic energy demand.

In addition or alternatively, wherein controlling the power supplied by the turbine and the electric motor assist includes optimally splitting the power demand between the power supplied by the turbine and the power supplied by the electric motor assist based on one or more conditions.

In addition or alternatively, wherein the one or more conditions may include one or more of: one or more defined limits on the power that can currently be supplied by the turbine and/or the electric motor assist, one or more defined over-rides and one or more defined power preferences.

In addition or alternatively, wherein controlling the power supplied by the turbine and the electric motor assist to meet the kinetic energy demand comprises controlling one or more actuators of the turbocharger.

In addition or alternatively, wherein controlling the power supplied by the turbine and the electric motor assist to meet the kinetic energy demand comprises controlling an electric power that is delivered to the electric motor assist.

In addition or alternatively, wherein controlling the power supplied by the turbine and the electric motor assist to meet the kinetic energy demand comprises controlling a waste gate actuator of the turbine.

In addition or alternatively, wherein the total power supplied by the turbine and the electric motor assist follows the kinetic energy demand.

In addition or alternatively, wherein controlling the power supplied by the turbine and the electric motor assist to meet the kinetic energy demand may include tracking an error between the turbocharger kinetic energy demand and the actual kinetic energy of the turbocharger rotating components, providing one or more feedback signals based on the tracking error, providing one or more feedforward signals that represent expected power to compress the air, add them to the feedback signals, and split their sum between the turbine power and the power of the electric power assist, generating control signals based on the one or more feedback signals and the one or more feedforward signals and applying the control signals to control the power supplied by the turbine and the power supplied by the electric motor assist to meet the kinetic energy demand.

In addition or alternatively, wherein the turbine comprises a waste-gate that controls a flow path that bypasses the turbine, and wherein the control signals may include a waste-gate signal to control an opening degree of the waste-gate and an electric power signal that controls the torque delivered by the electric motor assist.

In addition or alternatively, wherein the turbine is a variable geometry turbine with a vane actuator for controlling a position of one or more vanes of the variable geometry turbine, and wherein the control signals may include a vane control signal to control the vane actuator and an electric power signal that controls the torque delivered by the electric motor assist.

In addition or alternatively, wherein generating the control signals may include a non-linear transformation that transforms the preferred power supplied by the turbine to the waste-gate signal and transforms the preferred power supplied by the electric motor assist to the electric power signal.

An example non-transient computer readable medium storing program instructions that when executed by a processor, causes the processor to control a boost pressure provided by a turbocharger, wherein the turbocharger includes a compressor for providing the boost pressure, a turbine for driving the compressor through a turbocharger shaft, and an electric motor assist for assisting in driving the compressor through the turbocharger shaft, and one or more actuators for controlling the boost pressure provided by the turbocharger, wherein during operation, the turbine and the electric motor assist each capable of supplying power to the turbocharger shaft, and the compressor absorbs power to provide the boost pressure, the program instructions may cause the processor to receive a boost pressure demand and identify a compressor speed demand to achieve the received boost pressure demand. The program instructions may also cause the processor to convert the compressor speed demand into a kinetic energy demand for the turbine and the electric motor assist. The program instructions may also cause the processor to control a kinetic energy supplied by the turbine and the electric motor assist to meet the kinetic energy demand.

In addition or alternatively, wherein the program instructions causes the processor to identify the compressor speed demand to achieve the received boost pressure demand using a predefined compressor map.

In addition or alternatively, wherein the program instructions causes the processor to receive a signal that is representative of an actual boost pressure provided by the turbocharger, determine a power correction term based at least in part on the signal that is representative of the actual boost pressure provided by the turbocharger, and use the power correction term in controlling the kinetic energy supplied by the turbine and the electric motor assist to meet the kinetic energy demand.

In addition or alternatively, wherein the program instructions causes the processor to determine the power correction term using a Kalman filter.

In addition or alternatively, wherein the program instructions causes the processor to control the kinetic energy supplied by the turbine and the kinetic energy supplied by the electric motor assist using an optimal multivariable control with constraints.

An example method for controlling a boost pressure provided by a turbocharger, wherein the turbocharger includes a compressor for providing the boost pressure, a turbine for driving the compressor through a turbocharger shaft, and one or more actuators for controlling the boost pressure provided by the turbocharger, wherein during operation, the turbine supplies power to the turbocharger shaft, and the compressor absorbs power to provide the boost pressure includes receiving a boost pressure demand and identifying a compressor speed demand to achieve the received boost pressure demand. The method also includes converting the compressor speed demand into a power demand and controlling a power supplied by the turbine to meet the power demand.

In addition or alternatively, wherein the turbocharger further comprises an electric motor assist for assisting in driving the compressor through the turbocharger shaft, wherein the controlling step comprises controlling the power supplied by the turbine and the electric motor assist to meet the power demand.

The above summary of some embodiments is not intended to describe each disclosed embodiment or every implementation of the present disclosure. The Figures, and Detailed Description, which follow, more particularly exemplify these embodiments.

BRIEF DESCRIPTION OF THE DRAWINGS

The disclosure may be more completely understood in consideration of the following detailed description in connection with the accompanying drawings, in which.

Figure 1:
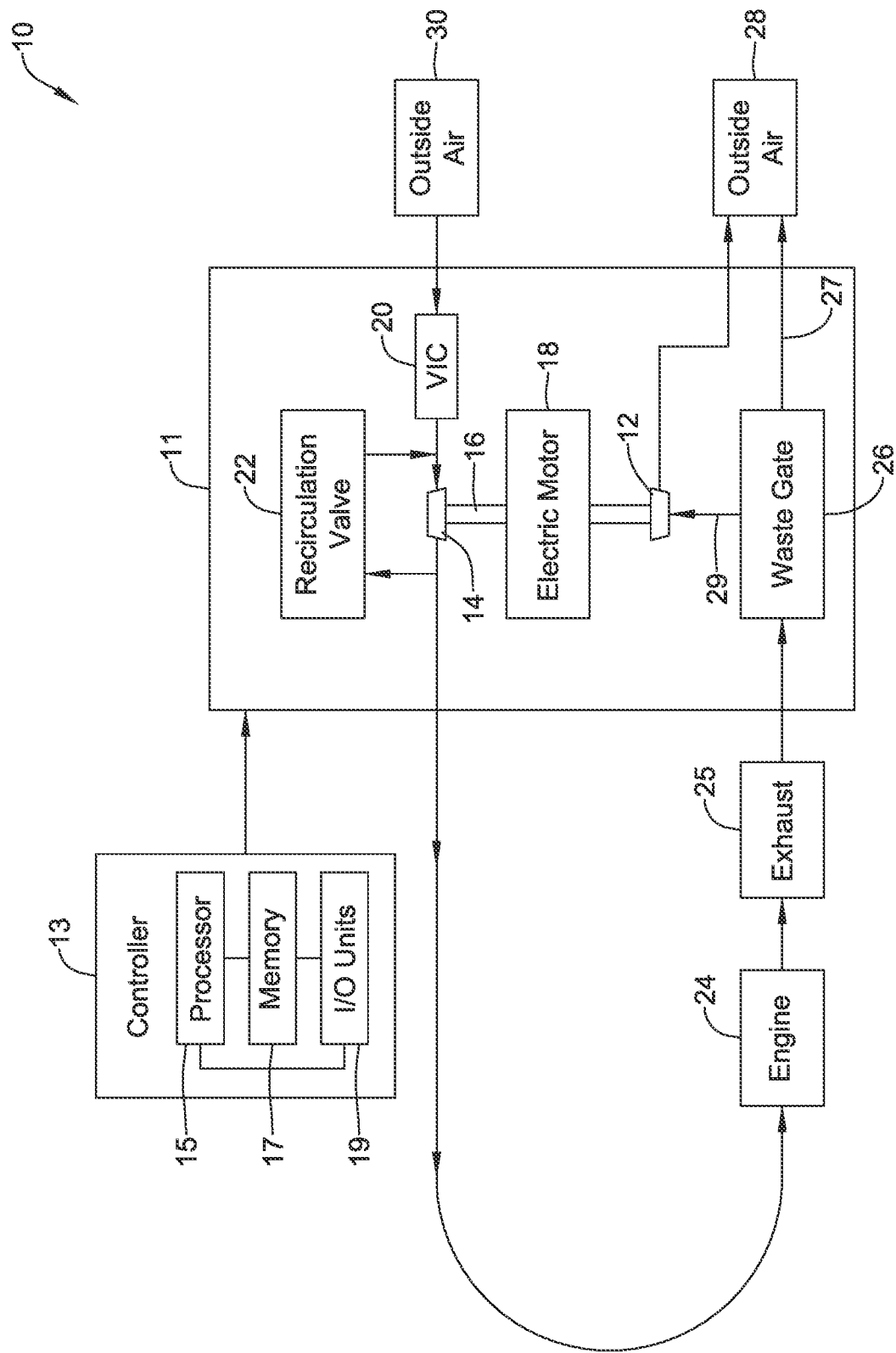
FIG. 1 is a block diagram of an illustrative electric motor assisted turbocharger servicing an internal combustion engine.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DESCRIPTION

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include one or more particular features, structures, and/or characteristics. However, such recitations do not necessarily mean that all embodiments include the particular features, structures, and/or characteristics. Additionally, when particular features, structures, and/or characteristics are described in connection with one embodiment, it should be understood that such features, structures, and/or characteristics may also be used connection with other embodiments whether or not explicitly described unless clearly stated to the contrary.

The following detailed description should be read with reference to the drawings in which similar elements in different drawings are numbered the same. The drawings, which are not necessarily to scale, depict illustrative embodiments and are not intended to limit the scope of the disclosure.

FIG. 1 is a block diagram of an illustrative engine system 10 that includes an illustrative electric motor assisted turbocharger 11 servicing an internal combustion engine 24. The illustrative electric motor assisted turbocharger 11 includes a turbine 12 connected to a compressor 14 via a shaft 16. An electrically assisted motor 18 may be coupled to the shaft 16 to assist in the acceleration and/or deceleration of the turbocharger shaft under certain operating conditions. The illustrative engine system 10 may further include a waste gate (WG) actuation valve unit 26, a variable inlet compressor (VIC) vane 20 and a recirculation valve (RCV) 22. In some cases, one or more of the waste gate (WG) actuation valve unit 26, the variable inlet compressor (VIC) vane 20 and/or the recirculation valve (RCV) 22 may not be provided.

Additionally, the engine system may include a controller 13. The controller 13 may be, be part of, and/or include an engine control module (ECM) or an engine control unit (ECU) with a control system algorithm therein. The controller 13 may include one or more components having one or more processors 15, memory 17, one or more input/output ports 19, and/or one or more other suitable components. The memory 17 may include one or more control system algorithms and/or other algorithms and the processor 15 may execute instructions (e.g., software code or other instructions) related to the algorithm(s) in the memory 17. The memory 17 may include instructions for execution by a processor. The memory 17 may be any suitable memory type and may be considered a computer readable medium configured to store instructions thereon in a non-transitory state. The I/O port 19 may send and/or receive information and/or control signals to and/or from the engine control system, including the engine 24 and the turbocharger 11.

In general, the automotive engine system 10 may operate by utilizing exhaust 25 expelled from the engine 24 to spin the turbine 12 of the illustrative electric motor assisted turbocharger 11. The reference numeral 29 represents exhaust that has not been diverted passed the turbine 12 by the waste gate 26. The exhaust flow 25 may spin the turbine 12 which, in turn, spins both the shaft 16 and the compressor 14. The compressor 14 may compress outside air 30 which is pulled into the system 10 via the spinning compressor 14. Prior to reaching the compressor 14, the outside air 30 may pass through a variable inlet compressor vane 20, but this is not required. The compressor 14 compresses the air 30 from the outside ambient pressure to a desired boost pressure, which is provided to the intake manifold of the engine 24 sometimes through an intercooler (not shown).

In some instances, the gas flow of the exhaust 25 is not sufficient to satisfy the immediate boost pressure demands of the engine 24, such as during rapid increases in engine load. This build of boost pressure (and delayed acceleration) may generally be referred to as a "turbo lag." To compensate for turbo lag, the electric motor 18 (when provided) may assist in the acceleration of the shaft 16 to more rapidly increase the boost pressure provided by the illustrative electric motor assisted turbocharger 11. In some cases, the electric motor 18 is not provided.

One of the challenges of controlling boost pressure of a turbocharger, such as the illustrative electric motor assisted turbocharger 11, is that the boost pressure is controlled by actuating a number of actuators (e.g., WG, RCV, VIC) often in a multi-variable and non-linear manner, and thus the control algorithms are often non-linear and resource intensive. To help reduce the complexity of such control, it may be desirable to control boost pressure via input variables that are linearly related to boost pressure. For example, it may be desirable to convert a boost pressure demand to a turbocharger speed (e.g., angular rotation of the shaft 16) via inversion of the compressor map of the turbocharger, and then to turbocharger kinetic energy and then controlling the kinetic energy to achieve the boost pressure demand. Controlling kinetic energy is a linear control problem. That is, controlling the kinetic energy of the turbocharger 12 has the advantage of deploying linear feedback and/or linear feedforward control algorithms to achieve a multivariable constrained control method in which the underlying equations are linear and possible uncertainties are more easily considered.

Figure 2A:
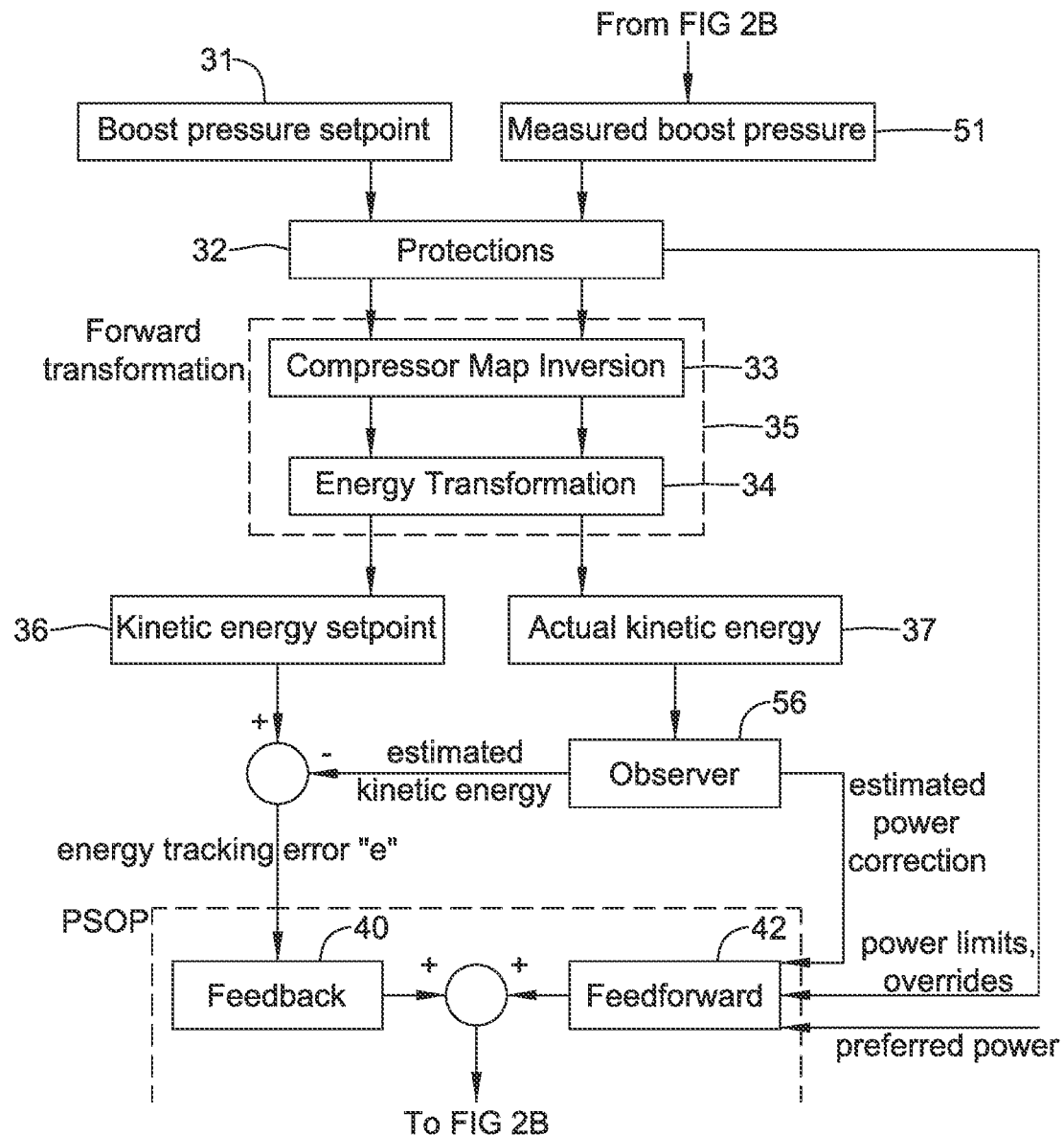
FIGS. 2A-2B are a flow diagram of an illustrative method of controlling the electric motor assisted turbocharger of FIG. 1.
Figure 2B:
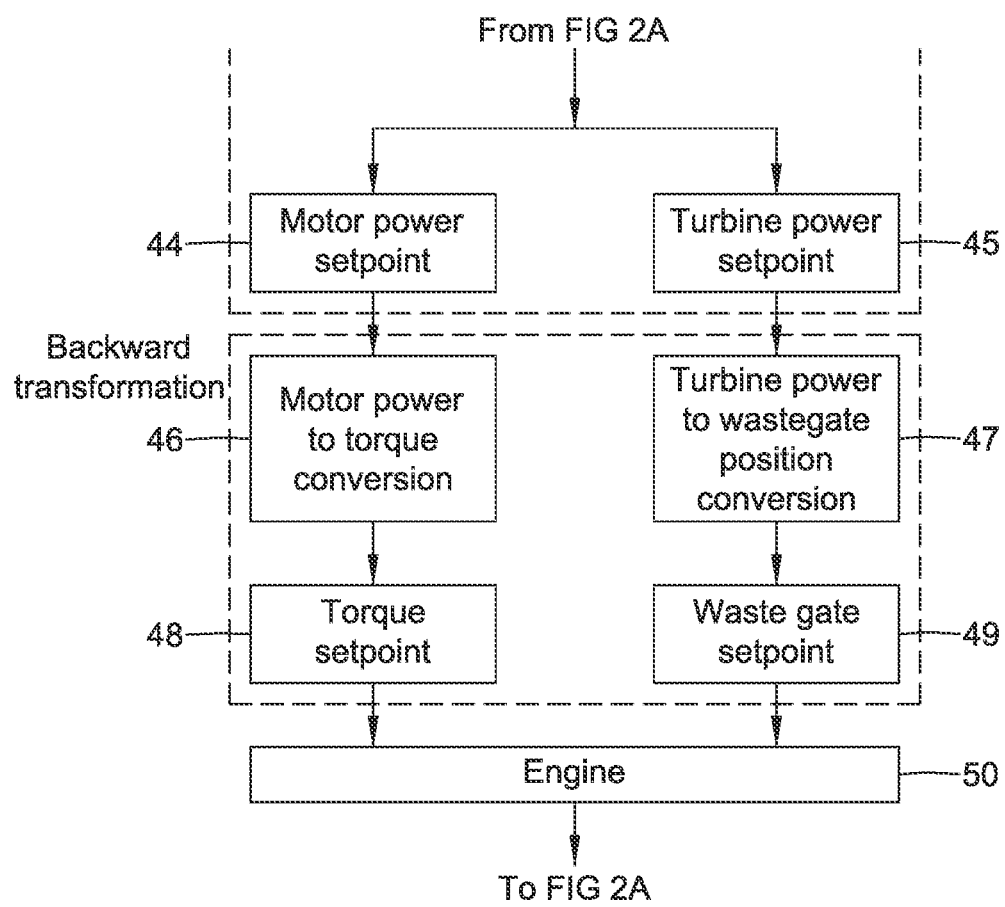

FIGS. 2A-2B are a flow diagram of an illustrative method of controlling the electric motor assisted turbocharger of FIG. 1. A boost pressure setpoint is received at 31, which, as described above, may be set to achieve a desired engine response (e.g., a desired acceleration). After the boost pressure setpoint 31 is received, one or more protections 32 may be applied to help prevent damage to the electric motor assisted turbocharger 11. For example, the protections 32 may adjust the received boost pressure setpoint 31 to protect against turbocharger over speeding, compressor outlet air overheating, turbocharger overheating and/or over boosting, surge protection, etc. In some examples, the protections 32 receive a number of parameters including the boost pressure setpoint 31 and a compressor mass air flow setpoint, and modify if necessary the boost pressure setpoint 31 and/or the compressor mass air flow setpoint to help protect the electric motor assisted turbocharger 11. In some cases, the protections 32 may also place limit on waste gate positions, set a maximum value on the torque output by the electric motor, and place limits on the position of the recirculation valve, when these are present.

In the example shown, the measured (e.g., actual) boost pressure 51 is translated into actual speed and actual kinetic energy 37 of the turbocharger while the boost pressure setpoint 31, sometimes as modified by the protections 32, is translated into an actual speed setpoint and a kinetic energy setpoint 36 of the turbocharger 11. A forward transformation from the measured boost pressure 51 to actual speed and actual kinetic energy 37 and from the boost pressure set point 31 to kinetic energy set point 36 is represent by block 35. In some cases, the forward transformation block 35 includes two blocks, a compressor map inversion block 33 and an energy transformation block 34. The compressor map inversion block 33 may transform the measured boost pressure 51 into an angular speed ω of the compressor 14, and thus the angular rotational speed of the shaft 16 described above. The compressor map inversion block 33 may also transform the boost pressure setpoint 31 into an angular speed ω setpoint of the compressor 14. These transformations may be based on the compressor map from the manufacture of the turbocharger 11. Once the measured boost pressure 51 and the boost pressure setpoint 31, sometimes as modified by the protections 32, are translated into an angular speed ω and an angular speed setpoint of the compressor 14, the energy transformation block 34 translates this angular speed ω into actual kinetic energy 37 and the angular speed setpoint into a kinetic energy setpoint 36 for the turbocharger 11.

For the electric motor assisted turbocharger 11 of FIG. 1, a power balance on the shaft 16 may be represented by:

$$\frac{d\omega}{dt} = \frac{1}{J}\left(\frac{P_t}{\omega} - \frac{P_c}{\omega} - M_{fric}\right)$$

where:

$$\frac{d\omega}{dt} = \text{change in angular speed of the turbocharger over time}$$

J=inertia of the turbocharger
$P_t$=power produced by the turbine
$P_c$=power consumed by the compressor
ω=angular speed of the compressor shaft
$M_{fric}$=frictional losses in the turbocharger The power applied by an electric motor assist, when present, adds an additional power term to the shaft 16:

$$T_e = \frac{P_e}{\omega}$$

where:
$P_e$=power produced by the electric assist motor
ω=angular speed of the compressor shaft
$T_e$=torque produced by the electric assist motor Accordingly, the power balance on the shaft 16 may be represented by:

$$\frac{d\omega}{dt} = \frac{1}{J}\left(T_e + \frac{P_t}{\omega} - \frac{P_c}{\omega} - M_{fric}\right)$$

The angular speed ω of the turbocharger may be transformed into kinetic energy "E" using the transformation $E=\frac{1}{2}J\omega^2$. A rate of change of kinetic energy "E" can be expressed by differentiating the transformation $E=\frac{1}{2}J\omega^2$ with respect to time, which yields:

$$\frac{dE}{dt} = J\omega\frac{d\omega}{dt}$$
$$\left(\frac{dE}{dt}\right)\left(\frac{1}{J\omega}\right) = \frac{d\omega}{dt}$$

Applying the above transformation to the power balance equation (and assuming $M_{fric}=0$ for simplicity purposes) and substituting for $$\frac{d\omega}{dt} = \left(\frac{dE}{dt}\right)\left(\frac{1}{J\omega}\right),$$

in the power balance equation above yields:

$$\left(\frac{dE}{dt}\right)\left(\frac{1}{J\omega}\right) = \frac{1}{J}\left(T_e + \frac{P_t}{\omega} - \frac{P_c}{\omega}\right)$$
$$\frac{dE}{dt} = (T_e\omega + P_t - P_c)$$

Additionally, knowing that $P_e=T_e\omega$, and substituting in the above equation yields:

$$\frac{dE}{dt} = (P_e + P_t - P_c)$$

where:

$$\frac{dE}{dt} = \text{change in kinetic energy over time}$$

$P_t$=power produced by the turbine
$P_c$=power consumed by the compressor
$P_e$=power produced by the electric assist motor The above equation illustrates that the kinetic energy (E) on the turbocharger shaft changes dynamically with the supplied power of the electric assist motor ($P_e$) plus the power produced by the turbine ($P_t$) and the power absorbed by the compressor ($P_a$) needed to compress the air. This kinetic energy power balance equation, expressed in the power domain, is linear with respect to the electric motor assist power ($P_e$), the turbine power ($P_t$) and the compressor power ($P_c$). It can be appreciated that, in some instances, it may be desirable to control the boost pressure of the turbocharger via manipulation of the turbine power ($P_t$), and in some cases the electric power ($P_e$) when an electric motor assist is present, in the linear power (energy) domain. As discussed above, because electromotor power ($P_e$) and turbine power ($P_t$) may be represented in the linear kinetic energy power balance equation, classic linear control theory may be utilized, which can greatly simplify the control algorithm and significantly reduce computational power requirements.

Further, the actual kinetic energy value 37 may represent the kinetic energy of the turbocharger 11 after the electric assist motor 18 and the waste gate 26 have been adjusted (as described above). In some instances, an observer 56 may be used to remove noise and otherwise filter the actual kinetic energy value 37. The observer 56 may also provide a power correction term to account for uncertainties and/or inaccuracies in the power computation.

In some cases, the observer 56 may include a Kalman filter. The internal model for the Kalman filter introduces the power correction term (v) which accumulates friction losses and inaccuracies into one term. The power balance model is then augmented to $$\frac{dE}{dt} = P_e + P_t - P_c + v$$
$$\frac{dv}{dt} = 0$$

which assumes that the power correction term (v) is constant disturbance in the steady state. The Kalman filter may be configured to estimate a kinetic energy value (Ê) and determine a power correction term (v̂) based on the resultant boost pressure. The estimated kinetic energy value (Ê) and the power correction term (v̂) may be determined such that they satisfy the augmented power balance equation. Accordingly, the power balance equation of the Kalman filter may be given as follows:

$$\frac{d\hat{E}}{dt} = P_{e,sp} + P_{t,sp} - P_c + \hat{v} + L_E(E - \hat{E})$$

$$\frac{d\hat{v}}{dt} = 0 + L_v(E - \hat{E})$$

where:

$\frac{d\hat{E}}{dt}$ = change in kinetic energy over time $\frac{d\hat{v}}{dt}$ = change in power correction over time $P_{e,sp}$=power of the electric assist motor set point
$P_{t,sp}$=power of the turbine set point
$P_c$=power of the compressor
v̂=power correction term
$L_E$, $L_v$=observer gains
E=actual kinetic energy
Ê=estimated energy The feedback from the actual boost pressure 51 is contained in the compressor power term ($P_c$) and the error between the actual kinetic energy (E) and the estimated energy (Ê). The observer gains ($L_E$, $L_v$) are an integral part of the control strategy because the estimated power correction (v̂) integrates the error between the actual and estimated kinetic energy (E–Ê).

Once the correction is applied to the actual kinetic energy value 37, an energy tracking error "e" is derived by calculating the difference between the actual kinetic energy 37 of the turbocharger (as modified by the observer 56) and the kinetic energy setpoint 36 derived from the boost pressure setpoint 31, sometimes modified by the protections 32. In some cases, some of the protections 32 may be extended to the observer 56 and enforced by the observer 56. A zero energy tracking error "e" implies that the actual boost pressure 51 equals the boost pressure setpoint 31. The energy tracking error may be fed back into the methodology and utilized to calculate the feedback parts 40 of the power of the electric assist motor 44 and the power of the turbine 45.

Referring to the kinetic energy power balance equation above, it can be appreciated that the compressor power ($P_c$) can be calculated using mass air flow through the compressor, the heat capacity of air, the inlet compressor pressure (or temperature) and the outlet compressor pressure (or temperature) using known method. Also, the kinetic energy (E) can be determined from the angular speed ω of the compressor shaft and the inertia of the turbocharger J. The electric motor assist power ($P_e$) and the turbine power ($P_t$) can be controlled using feedback and/or feedforward control to satisfy the kinetic energy power balance equation.

There will often be multiple solutions to the kinetic energy power balance equation. For example, under some conditions, the turbine power ($P_t$) may supply most or all of the power necessary to satisfy the kinetic energy power balance equation. Under other conditions, the electric motor assist power ($P_e$) may supply most or all of the power necessary to satisfy the kinetic energy power balance equation. Under some conditions, the power to satisfy the kinetic energy power balance equation may be split between the power supplied by the turbine and the power supplied by the electric motor assist.

The power provided by the electric assist motor ($P_e$) 44 and the power provided by the turbine ($P_t$) 45 may be determined as the summation of a feedback control part 40 and a feedforward control part 42, such as represented by the following equations:

$$P_{e,sp} = P_{e,FB} + P_{e,FF}$$

$$P_{t,sp} = P_{t,FB} + P_{t,FF}$$

where:
$P_{e,sp}$=power set point for the electric assist motor
$P_{e,FB}$=feedback control part of the electric assist motor power
$P_{e,FF}$=feedforward control part of the electric assist motor power
$P_{t,sp}$ power set point of the turbine
$P_{t,FB}$=feedback control part of the turbine power
$P_{t,FF}$=feedforward control part of the turbine power In one example, the feedback parts include a proportional (P) control term that is a product of a feedback gain G and an energy tracking error (e), as shown by the following equations:

$$P_{e,FB} = G_e e$$

$$P_{t,FB} = G_t e$$

where:
$G_e$=feedback gain for the electric assist motor power
$G_t$=feedback gain for the turbine power
e=energy tracking error In the example shown, the energy tracking error "e" is the difference between the current kinetic energy of the turbocharger and the kinetic energy setpoint 36 derived from the boost pressure setpoint 31, sometimes as modified by the protections 32. A zero energy tracking error "e" implies that the actual boost pressure 51 equals the boost pressure setpoint 31.

The feedforward parts 42 may be determined by formulating and solving a Power Split Optimization Problem (PSOP). The PSOP may provide the following feedforward parts:

$$P_{e,FF}$$

$$P_{t,FF}$$

where:
$P_{e,FF}$=feedforward control part of the electric assist motor
$P_{t,FF}$=feedforward control part of the turbine The PSOP is configured to generate these feedforward parts while satisfying a set of constraints. The PSOP may provide an optimized solution for actual and past values of the power, limits, references, and repeat the optimization in the next sampling for the new incoming measurements. In this way, the PSOP may be configured to anticipate and adjust $P_{e,FF}$ and $P_{t,FF}$ according to varying conditions on the engine. The PSOP may generate the feedforward parts while solving the following optimization problem:

$$\min_{P_{e,FF}, P_{t,FF}} R_e(P_{e,FF} - P_{e,ref})^2 + R_t(P_{t,FF} - P_{t,ref})^2 + \ldots +$$

$$R_{\Delta e}(P_{e,FB} + P_{e,FF} - P_{e,past})^2 + R_{\Delta t}(P_{t,FB} + P_{t,FF} - P_{t,past})^2$$

subject to $$P_{e,FF} + P_{t,FF} - P_c + \hat{v} = 0 \quad \text{setpoint tracking condition}$$

$$P_{e,min} \leq P_{e,FB} + P_{e,FF} \leq P_{e,max} \quad \text{electric motor power limits}$$

$$P_{t,min} \leq P_{t,FB} + P_{t,FF} \leq P_{t,max} \quad \text{turbine power limits}$$

$$\Delta P_{e,min} \leq P_{e,FB} + P_{e,FF} - P_{e,past} \leq \Delta P_{e,max} \quad \text{electric motor power rate limits}$$

$$\Delta P_{t,min} \leq P_{t,FB} + P_{t,FF} - P_{t,past} \leq \Delta P_{t,max} \quad \text{turbine power rate limits}$$

where:
$R_e$=optimization weight for the preferred power of the electric assist motor
$R_t$=optimization weight for the turbine preferred power
$R_{\Delta e}$=optimization weight for electric motor power rate
$R_{\Delta t}$=optimization weight for turbine power rate
$P_{e,ref}$=preferred power for the electric assist motor
$P_{t,ref}$=preferred power for the turbine
$P_{e,past}$=power for the electric assist motor applied in the previous sample
$P_{t,past}$=power for the turbine applied in the previous sample
$P_{e,min}$=minimum power allowed for the electric assist motor
$P_{e,max}$=maximum power allowed for the electric assist motor
$P_{t,min}$=minimum power allowed for the turbine
$P_{t,max}$=maximum power allowed for the turbine
$\Delta P_{e,min}$=minimum power rate allowed for the electric assist motor
$\Delta P_{e,max}$=maximum power rate allowed for the electric assist motor
$\Delta P_{t,min}$=minimum power rate allowed for the turbine
$\Delta P_{t,max}$=maximum power rate allowed for the turbine
$P_c$=actual computed power of the compressor
$\hat{v}$=estimated power correction from the observer In the example shown, the PSOP produces a calculated setpoint for the power of the electric assist motor ($P_{e,sp}$) and a calculated setpoint for the power of the turbine ($P_{t,sp}$) that collectively satisfy the power balance equation while staying within the applicable constraints. As can be seen, in this example, the power to drive the compressor to achieve the boost pressure setpoint is split between the electric assist motor and the turbine.

Once the setpoint for the power of the electric assist motor ($P_{e,sp}$) 44 and the setpoint for the power of the turbine ($P_{t,sp}$) 45 have been determined, the setpoint for the power of the electric assist motor ($P_{e,sp}$) 44 may be transformed 46 into an electric motor torque setpoint 48 and the setpoint for the power of the turbine ($P_{t,sp}$) 45 may be transformed 47 into a waste gate setpoint 49 for the turbine.

Figure 7:
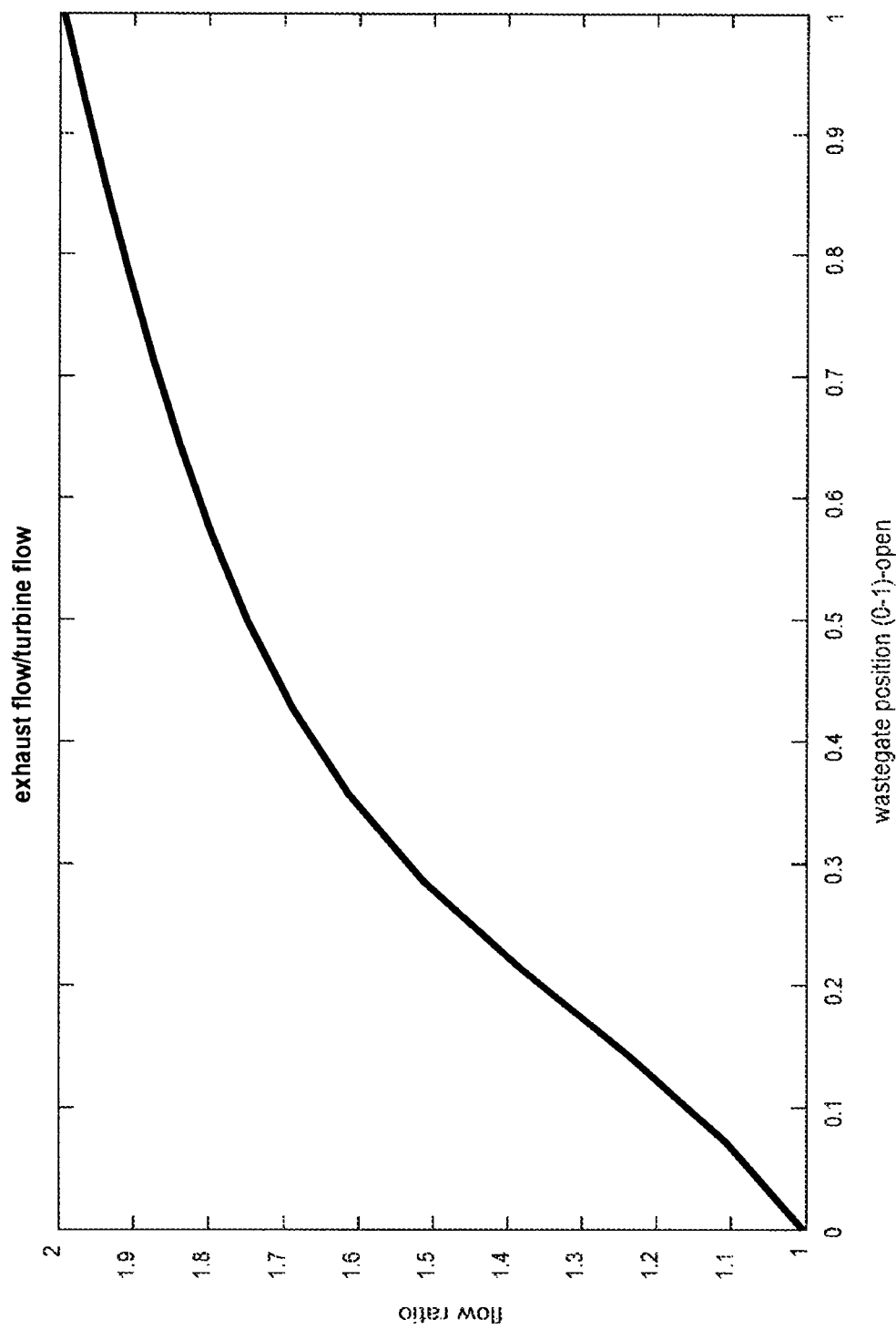
FIG. 7 is a graph showing a relationship of flow ratio and wastegate position.

The setpoint for the power of the electric assist motor 44 may be transformed 46 into an electric motor torque setpoint 48 via the following torque-power relationship:

$$T_{e,sp} = \frac{P_{e,sp}}{\omega}$$

where:
$T_{e,sp}$=electric motor torque set point
$P_{e,sp}$=power of the electromotor set point
$\omega$=angular speed of the turbine The setpoint for the power of the turbine ($P_{t,sp}$) 45 may be transformed 47 into a waste gate setpoint 49. This inverse transformation relies on the exhaust measurements that characterize the exhaust flow split between the wastegate and turbine as a function of wastegate opening. In particular, total exhaust flow given ($\dot{m}_{exh}$) can be mapped versus turbine flow ($\dot{m}_t$) determined from the turbine flow map. Turbine flow map belongs to the turbocharger characteristics and it is a function of turbine rotational speed (N), exhaust gas temperature at the turbine inlet ($T_{it}$), and exhaust gas pressure ratio of measured the turbine outlet ($p_{ot}$) and turbine inlet ($p_{it}$) expressed in general as $\dot{m}_t(N,T_{it},p_{it},p_{ot})$. The exhaust gas mass flow to the turbine flow ratio is given by $$f(u_{WG}) = \frac{\dot{m}_{exh}}{\dot{m}_t}$$

which is abbreviated here as wastegate nonlinearity and depends on the wastegate opening. Typical dependency may be visualized as shown in FIG. 7.

For fully closed position of the wastegate, the wastegate nonlinearity gives the ratio 1 because turbine flow equals the exhaust flow. The nonlinearity increases monotonically until the ratio settles at some maximum value for fully open waste gate position. Under assumption that this ratio remains monotonic and does not significantly change over the engine operation, it can be mapped and inverted to get $u_{WG}$.

The inverse transformation of the turbine power setpoint to the wastegate position relies on the above wastegate nonlinearity map. Consider the turbine power is given by:

$$P_{t,sp} = \dot{m}_t c_{p,t} T_{it} \left(1 - \left(\frac{p_{ot}}{p_{it}}\right)^{\frac{\gamma-1}{\gamma}}\right) \eta_t$$

where:
$\dot{m}_t$=turbine mass flow
$c_{p,t}$=exhaust gas heat capacity
$T_{it}$=exhaust gas temperature at the turbine inlet
$p_{it}$=exhaust gas pressure at the turbine inlet
$p_{ot}$=exhaust gas pressure at the turbine outlet
$\gamma$=exhaust gas heat capacity ratio
$\eta_t$=turbine efficiency given as a map that depends on turbine rotational speed (N) and turbine pressure ratio ($p_{ot}/p_{it}$).

Substitute the turbine flow with the wastegate nonlinearity flow ratio to get $$P_{t,sp} = \left(\frac{\dot{m}_{exh}}{f(u_{WG,sp})}\right) c_{p,t} T_{it} \left(1 - \left(\frac{p_{ot}}{p_{it}}\right)^{\frac{\gamma-1}{\gamma}}\right) \eta_t$$

Eliminating $f(u_{WG,sp})$ from the above equation results in a function that maps the turbine power setpoint to the flow ratio setpoint $$f(u_{WG,sp}) = \left(\frac{\dot{m}_{exh}}{P_{t,sp}}\right) c_{p,t} T_{it} \left(1 - \left(\frac{p_{ot}}{p_{it}}\right)^{\frac{\gamma-1}{\gamma}}\right) \eta_t$$

The flow ratio setpoint can be transformed to the waste gate setpoint ($u_{WG,sp}$) using the wastegate nonlinearity inverse map.

After the electric assist motor torque setpoint 48 and the waste gate setpoint 49 are determined using the above calculations, the electric motor torque setpoint signal 48 and the waste gate setpoint signal 49 may be used to control the electrical current supplied to the electric assist motor and the position of the waste gate actuator of the turbocharger 11.

It can be appreciated that after the electric assist motor 18 and the waste gate 26 are adjusted, the turbocharger 11 may generate a boost pressure which reflects the determined settings of the torque of the electric assist motor 18 and the position of the waste gate 26. This resultant boost pressure may be measured or otherwise determined or estimated as block 51.

Figure 3:
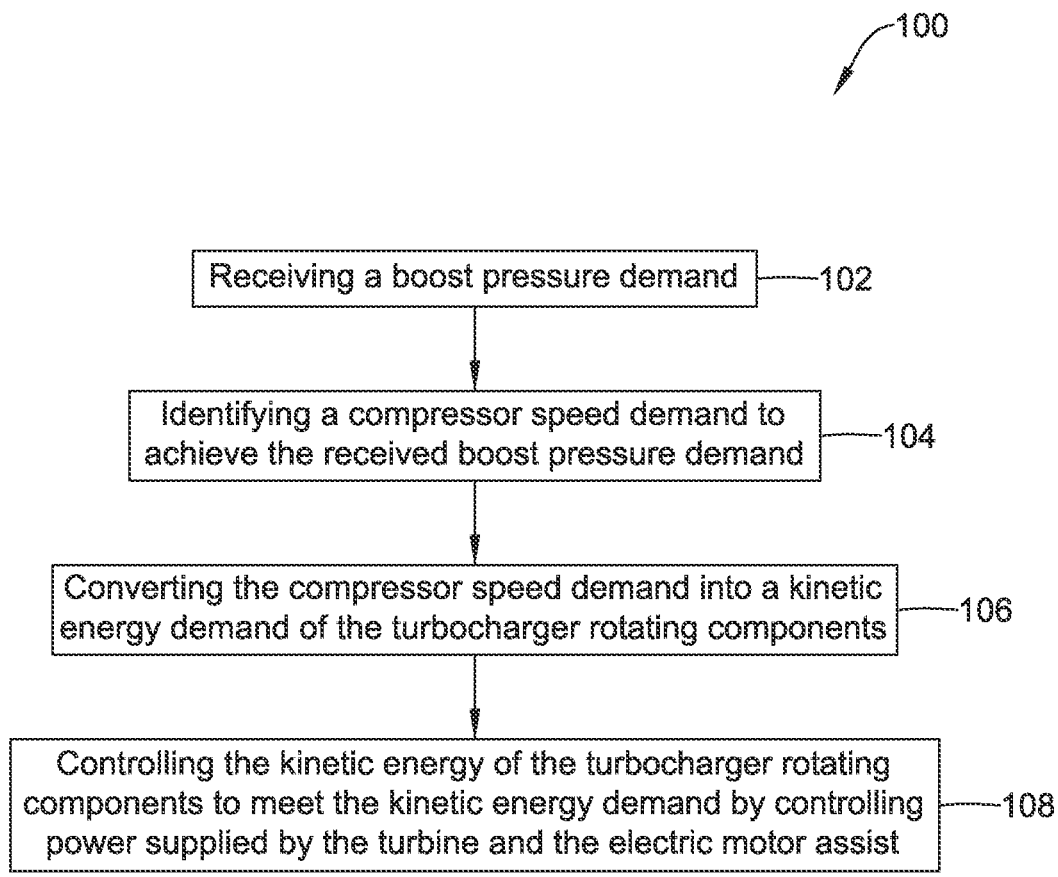
FIG. 3 is a flow diagram showing an illustrative method of controlling components of an engine system.

FIG. 3 depicts an illustrative method 100 of controlling the operation of an engine system. In some cases, the method may be configured to control a boost pressure provided by a turbocharger, wherein the turbocharger includes turbocharger rotating components including a turbocharger shaft, a compressor for providing the boost pressure, and a turbine for driving the compressor through the turbocharger shaft. The turbocharger may further include an electric motor assist for assisting in driving the compressor through the turbocharger shaft, and one or more actuators for controlling the boost pressure provided by the turbocharger, wherein during operation, the turbine and the electric motor assist are each capable of supplying power to the turbocharger shaft, and the compressor absorbs power to provide the boost pressure. The method 100 may also include receiving 102 a boost pressure demand. The method may further include identifying 104 a compressor speed demand to achieve the received boost pressure demand. Further, the method may include converting 106 the compressor speed demand into a kinetic energy demand of the turbocharger rotating components. Additionally, the method may include controlling 108 the kinetic energy of the turbocharger rotating components to meet the kinetic energy demand by controlling power supplied by the turbine and the electric motor assist.

Figure 4:
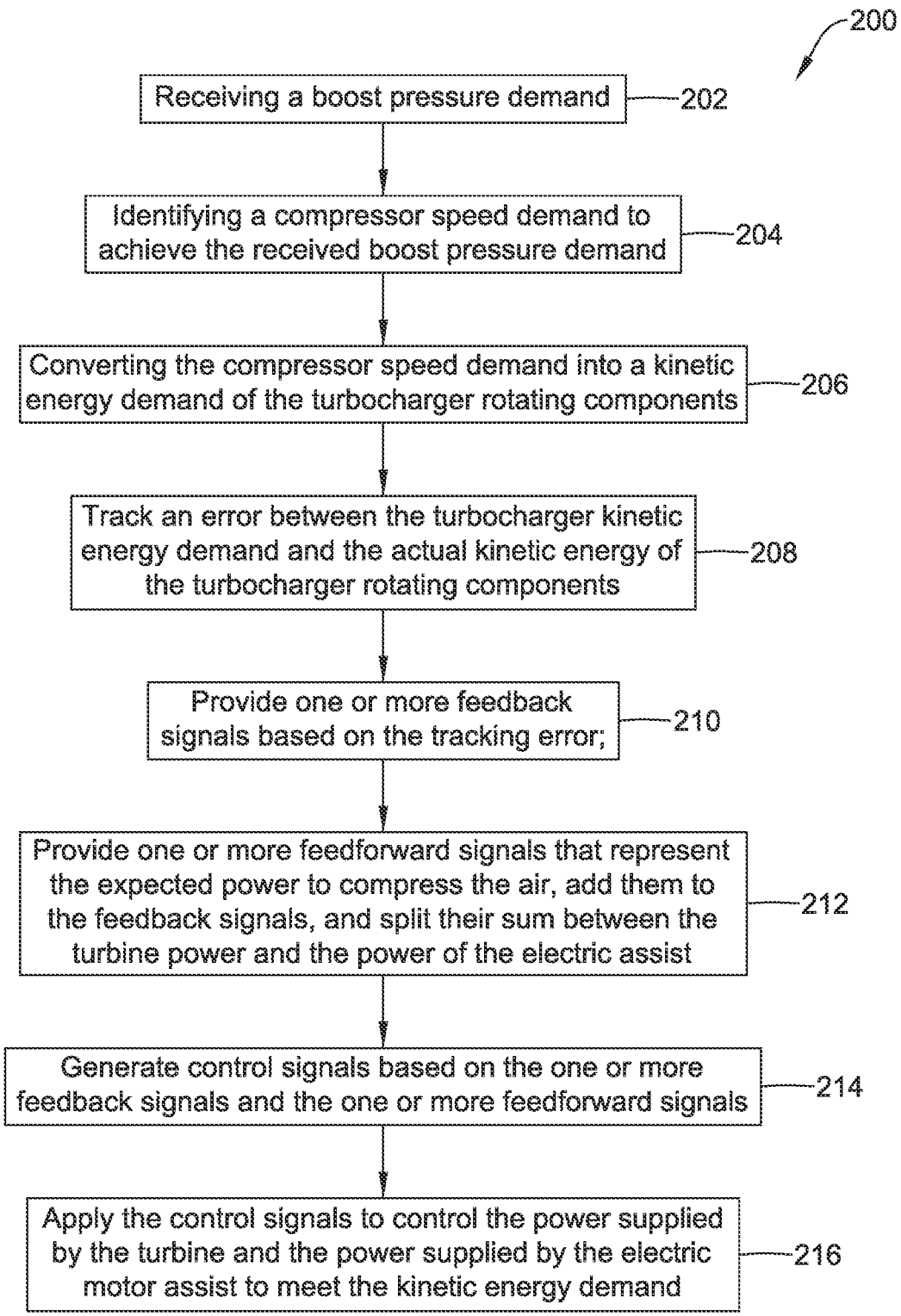
FIG. 4 is a flow diagram showing an illustrative method of controlling components of an engine system.

FIG. 4 depicts an illustrative method 200 of controlling the operation of an engine system. In some cases, the method may be configured to control a boost pressure provided by a turbocharger, wherein the turbocharger includes turbocharger rotating components including a turbocharger shaft, a compressor for providing the boost pressure, and a turbine for driving the compressor through the turbocharger shaft. The turbocharger may further include an electric motor assist for assisting in driving the compressor through the turbocharger shaft, and one or more actuators for controlling the boost pressure provided by the turbocharger, wherein during operation, the turbine and the electric motor assist are each capable of supplying power to the turbocharger shaft, and the compressor absorbs power to provide the boost pressure. The method 200 may also include receiving 202 a boost pressure demand. The method may further include identifying 204 a compressor speed demand to achieve the received boost pressure demand. Further, the method may include converting 206 the compressor speed demand into a kinetic energy demand of the turbocharger rotating components. Additionally, the method may include tracking 208 an error between the turbocharger kinetic energy demand and the actual kinetic energy of the turbocharger rotating components. The method may further include providing 210 one or more feedback signals based on the tracking error. The method may also include providing 212 one or more feedback signals that splits the kinetic energy demand between a preferred power supplied by the turbine and a preferred power supplied by the electric motor assist. Additionally, the method may include generating 214 control signals and the one or more feedforward signals, and applying 216 the control signals to control the power supplied by the turbine and the power supplied by the electric motor assist to meet the kinetic energy demand.

Figure 5:
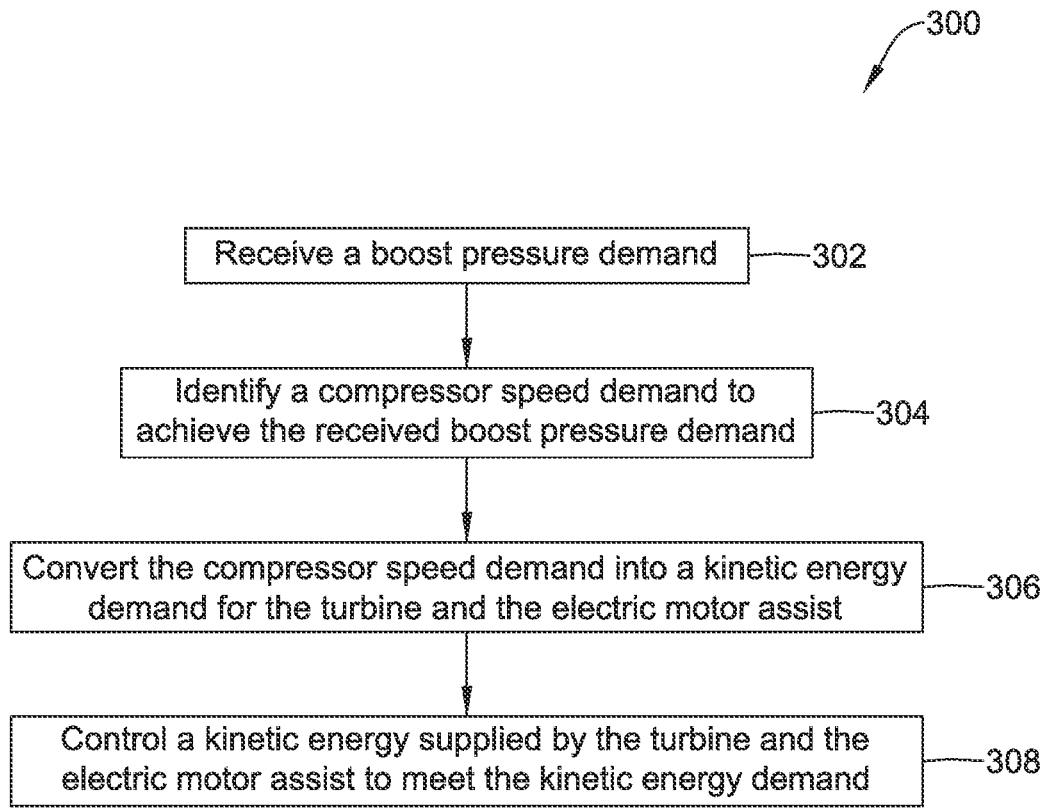
FIG. 5 is a flow diagram showing an illustrative method of controlling components of an engine system.

FIG. 5 depicts an illustrative method 300 which includes a non-transient computer readable medium storing program instructions that when executed by a processor, causes the processor to control a boost pressure provided by a turbocharger. The turbocharger may include a compressor for providing the boost pressure, a turbine for driving the compressor through a turbocharger shaft and an electric motor assist for assisting in driving the compressor through the turbocharger shaft. The method may also include one or more actuators for controlling the boost pressure provided by the turbocharger, wherein during operation, the turbine and the electric motor assist each are capable of supplying power to the turbocharger shaft and the compressor absorbs power to provide the boost pressure. In some examples, the program instructions may cause the processor to receive 302 a boost pressure demand. The program instructions may also identify 304 a compressor speed demand to achieve the received boost pressure demand. Further, the program instructions may convert 306 the compressor speed demand into a kinetic energy demand for the turbine and the electric motor assist. Additionally, the program instructions may control 308 the kinetic energy of the turbocharger rotating components to meet the kinetic energy demand by controlling power supplied by the turbine and the electric motor assist.

Figure 6:
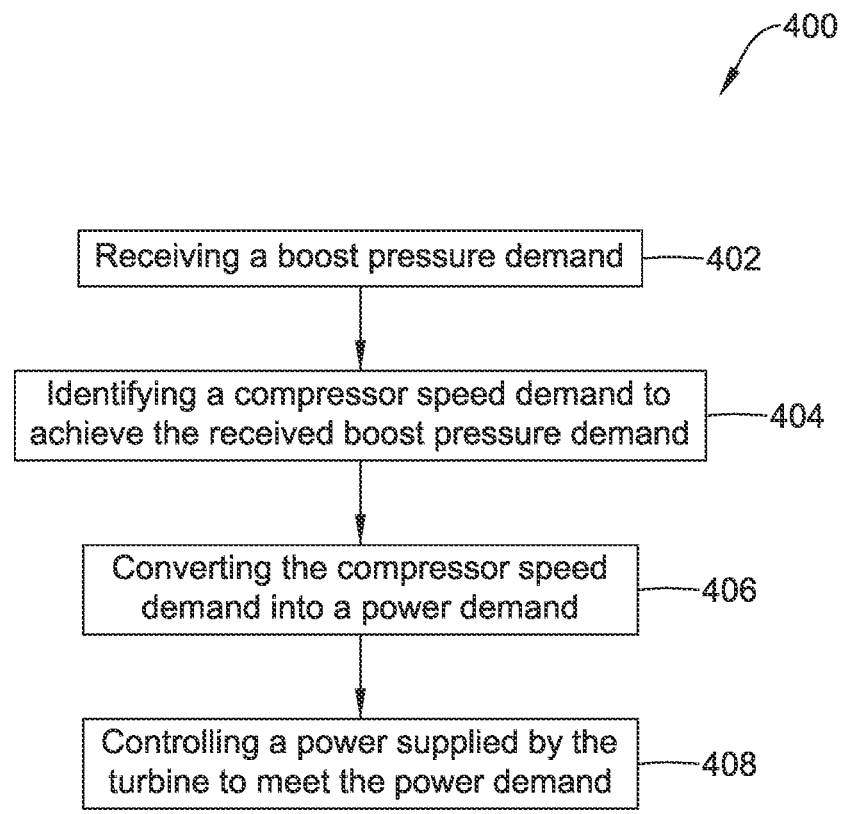
FIG. 6 is a flow diagram showing an illustrative method of controlling components of an engine system.

FIG. 6 depicts an illustrative method 400 of controlling a boost pressure provided by a turbocharger, wherein the turbocharger includes a compressor for providing the boost pressure, a turbine for driving the compressor through a turbocharger shaft, and one or more actuators for controlling the boost pressure provided by the turbocharger, wherein during operation, the turbine supplies power to the turbocharger shaft, and the compressor absorbs power to provide the boost pressure. The method 100 may also include receiving 102 a boost pressure demand. The method may further include identifying 104 a compressor speed demand to achieve the received boost pressure demand. Further, the method may include converting 106 the compressor speed demand into a kinetic energy demand of the turbocharger rotating components. Additionally, the method may include controlling 108 the kinetic energy of the turbocharger rotating components to meet the kinetic energy demand by controlling power supplied by the turbine and the electric motor assist.

It should be understood that this disclosure is, in many respects, only illustrative. Changes may be made in details, particularly in matters of shape, size, and arrangement of steps without exceeding the scope of the disclosure. This may include, to the extent that it is appropriate, the use of any of the features of one example embodiment being used in other embodiments. The disclosure's scope is, of course, defined in the language in which the appended claims are expressed.

What is claimed is:

1. A method for controlling a boost pressure provided by a turbocharger, wherein the turbocharger includes turbocharger rotating components including a turbocharger shaft, a compressor for providing the boost pressure, and a turbine for driving the compressor through the turbocharger shaft, the turbocharger further including an electric motor assist for assisting in driving the compressor through the turbocharger shaft, and one or more actuators for controlling the boost pressure provided by the turbocharger, wherein during operation, the turbine and the electric motor assist are each capable of supplying power to the turbocharger shaft, and the compressor absorbs power to provide the boost pressure, the method comprising:

receiving a boost pressure demand;
identifying a compressor speed demand to achieve the received boost pressure demand;
converting the compressor speed demand into a kinetic energy demand of the turbocharger rotating components; and
controlling the kinetic energy of the turbocharger rotating components to meet the kinetic energy demand by controlling power supplied by the turbine and the electric motor assist.

2. The method of claim 1, wherein controlling the power supplied by the turbine and the electric motor assist comprises using multivariable control with power constraints.

3. The method of claim 1, wherein controlling the power supplied by the turbine and the electric motor assist to meet the kinetic energy demand comprises controlling one or more actuators of the turbocharger.

4. The method of claim 1, wherein controlling the power supplied by the turbine and the electric motor assist to meet the kinetic energy demand comprises controlling an electric power that is delivered to the electric motor assist.

5. The method of claim 1, wherein controlling the power supplied by the turbine and the electric motor assist comprises controlling the power supplied by the turbine and the power supplied by the electric motor assist to collectively meet the kinetic energy demand.

6. The method of claim 5, wherein controlling the power supplied by the turbine and the electric motor assist comprises optimally splitting the power demand between the power supplied by the turbine and the power supplied by the electric motor assist based on one or more conditions.

7. The method of claim 6, wherein the one or more conditions comprise one or more of:
one or more defined limits on the power that can currently be supplied by the turbine and/or the electric motor assist;
one or more defined over-rides; and
one or more defined power preferences.

8. The method of claim 1, wherein controlling the power supplied by the turbine and the electric motor assist to meet the kinetic energy demand comprises controlling a waste gate actuator of the turbine.

9. The method of claim 8, wherein the total power supplied by the turbine and the electric motor assist follows the kinetic energy demand.

10. The method of claim 1, wherein controlling the power supplied by the turbine and the electric motor assist to meet the kinetic energy demand comprises:
track an error between the turbocharger kinetic energy demand and the actual kinetic energy of the turbocharger rotating components;
provide one or more feedback signals based on the tracking error;
provide one or more feedforward signals that represent the expected power required to compress the air;
sum the feedback and the feedforward terms to get the total demand of power to be applied on turbocharger shaft to control the kinetic energy;
split the total power demand between the demands for turbine power and motor power so that the applicable constraints are satisfied and optimum with respect to a relevant cost function is achieved;
apply the control signals to control the power supplied by the turbine and the power supplied by the electric motor assist to meet their respective individual power demands.

11. The method of claim 10, wherein the turbine is a variable geometry turbine with a vane actuator for controlling a position of one or more vanes of the variable geometry turbine, and wherein the control signals comprise:
a vane control signal to control the vane actuator; and
an electric power signal that controls the torque delivered by the electric motor assist.

12. The method of claim 10, wherein the turbine comprises a waste-gate that controls a flow path that bypasses the turbine, and wherein the control signals comprise:
a waste-gate signal to control an opening degree of the waste-gate; and
an electric power signal that controls the torque delivered by the electric motor assist.

13. The method of claim 12, wherein generating the control signals comprises a non-linear transformation that transforms the preferred power supplied by the turbine to the waste-gate signal and transforms the preferred power supplied by the electric motor assist to the electric power signal.

14. A non-transient computer readable medium storing program instructions that when executed by a processor, causes the processor to control a boost pressure provided by a turbocharger, wherein the turbocharger includes a compressor for providing the boost pressure, a turbine for driving the compressor through a turbocharger shaft, and an electric motor assist for assisting in driving the compressor through the turbocharger shaft, and one or more actuators for controlling the boost pressure provided by the turbocharger, wherein during operation, the turbine and the electric motor assist each capable of supplying power to the turbocharger shaft, and the compressor absorbs power to provide the boost pressure, the program instructions cause the processor to:
receive a boost pressure demand;
identify a compressor speed demand to achieve the received boost pressure demand;
convert the compressor speed demand into a kinetic energy demand for the turbine and the electric motor assist; and
control a kinetic energy supplied by the turbine and the electric motor assist to meet the kinetic energy demand.

15. The non-transient computer readable medium of claim 14, wherein the program instructions cause the processor to identify the compressor speed demand to achieve the received boost pressure demand using a predefined compressor map.

16. The non-transient computer readable medium of claim 14, wherein the program instructions cause the processor to control the kinetic energy supplied by the turbine and the kinetic energy supplied by the electric motor assist using an optimal multivariable control with constraints.

17. The non-transient computer readable medium of claim 14, wherein the program instructions cause the processor to:
receive a signal that is representative of an actual boost pressure provided by the turbocharger;
determine a power correction term based at least in part on the signal that is representative of the actual boost pressure provided by the turbocharger; and
use the power correction term in controlling the kinetic energy supplied by the turbine and the electric motor assist to meet the kinetic energy demand.

18. The non-transient computer readable medium of claim 17, wherein the program instructions cause the processor to determine the power correction term using a Kalman filter.

* * * * *